United States Patent
Rao et al.

(10) Patent No.: US 8,295,893 B2
(45) Date of Patent: Oct. 23, 2012

(54) SYSTEM AND METHOD FOR MANAGING POWER CONSUMPTION IN A DEVICE

(75) Inventors: Yadunandana N. Rao, Sunrise, FL (US); Scott M. Alazraki, Davie, FL (US); Apoorv Chaudhri, Cambridge, MA (US)

(73) Assignee: Motorola Solutions, Inc., Schaumburg, IL (US)

( * ) Notice: Subject to any disclaimer, the term of this patent is extended or adjusted under 35 U.S.C. 154(b) by 235 days.

(21) Appl. No.: 12/879,053

(22) Filed: Sep. 10, 2010

(65) Prior Publication Data

US 2012/0064853 A1    Mar. 15, 2012

(51) Int. Cl.
*H04B 1/38* (2006.01)
*H04M 1/00* (2006.01)

(52) U.S. Cl. .......... 455/574; 455/127.5; 455/343.1; 455/343.2; 455/343.5

(58) Field of Classification Search .......... 455/574, 455/127.5, 127.1, 343.1, 343.2, 343.5
See application file for complete search history.

(56) References Cited

U.S. PATENT DOCUMENTS

| | | | |
|---|---|---|---|
| 535,518 A | 3/1895 | Weiss | |
| 4,955,038 A * | 9/1990 | Lee et al. | 375/256 |
| 5,144,296 A | 9/1992 | DeLuca et al. | |
| 5,448,756 A | 9/1995 | DeLuca et al. | |
| 5,794,137 A | 8/1998 | Harte | |
| 5,845,204 A | 12/1998 | Chapman et al. | |
| 2006/0294582 A1 * | 12/2006 | Linsley-Hood et al. | 726/6 |
| 2007/0218861 A1 | 9/2007 | Walston | |
| 2009/0149127 A1 * | 6/2009 | Viitamaki et al. | 455/41.2 |

FOREIGN PATENT DOCUMENTS

KR    1020070075666 A    7/2007

OTHER PUBLICATIONS

PCT International Search Report Dated Jan. 18, 2012 for Counterpart Application.

* cited by examiner

*Primary Examiner* — Tuan Pham
(74) *Attorney, Agent, or Firm* — Kenneth A. Haas; Valerie M. Davis (57) ABSTRACT

Systems and methods for managing power consumption in a device include toggling an ON-OFF setting of apparatus, which controls a carrier detector. The toggling is carried out according to a first duty cycle having a fixed OFF-time duration and a first dwell time having a first dwell time duration during which the carrier detector performs radio frequency carrier detection function. The device receives at least one input that affects the radio frequency carrier detection function, and the first duty cycle is changed to a second duty cycle. The toggling is carried out according to the second duty cycle, which has the same fixed OFF-time duration of the first duty cycle and a second dwell time having a second dwell time duration that is longer than the first dwell time duration, during which the radio frequency carrier detection function is performed.

20 Claims, 5 Drawing Sheets

FIG. 5

SYSTEM AND METHOD FOR MANAGING POWER CONSUMPTION IN A DEVICE

TECHNICAL FIELD

The present disclosure relates generally to communication systems and in particular to a system and method of managing power consumption in a device.

BACKGROUND

Efficient, reliable, and real-time communication with minimal latency, by way of communication devices with long battery life, is a critical requirement for first responders and other public safety professionals. To this end, the Telecommunications Industry Association (TIA) adopted and standardized a suite of Land Mobile Radio (LMR) standards termed Project 25 (P25), as described for example, in the TIA 102-series documents.

Emerging standards, for example, have improved radio communications and interoperability; however, radio battery life is still a primary challenge for the implementation of radio communication systems. Generally, a common technique for improving battery life in a communications device includes the implementation of duty-cycling of integrated circuits (ICs) that limit or cut down the processing of carrier signals. In one particular example, current implementations of a battery save system in a communications device include cycling between an ON-time (also referred to herein as a dwell time) and an OFF-time (also referred to herein as an off-time), of apparatus, such as a transceiver IC, that controls a carrier detector, at a fixed 50% rate.

Under many circumstances, however, fixed duty cycling rate is not an optimal solution. For instance, in the case of a fixed duty cycle, the carrier detector is time-limited as the detector attempts to find the carrier while simultaneously maintaining a low falsing rate. Thus, a battery save system employing a fixed duty cycling of the transceiver IC can result in a combination of: increased system access times, due to delays in carrier detection; increased missed calls, due to missed carrier detection; and transmission on a busy channel.

Accordingly, there is a need for a system and method of managing power consumption in a device.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method of managing power consumption in a communications device. Moreover, as described herein, the terms "device", "communications device", and "subscriber" are used to refer to any device capable of receiving a carrier signal, such as a radio frequency (RF) signal, and includes, for example, any combination of analog and digital portable radios, base stations, repeaters, and RF subsystems. Further, certain advantages of the methods as described herein, are beneficial to any type of subscriber on a communications network.

Accordingly, methods for managing power consumption in a device include toggling a power setting of apparatus, which controls a carrier detector, between an ON-setting and an OFF-setting. For purposes of this disclosure, the phrase "toggling the power setting of apparatus that controls the carrier detector" is generally used to describe toggling the power setting of apparatus that "directly" controls the carrier detector or toggling the power setting of apparatus that "indirectly" controls the carrier detector, wherein "controlling" the carrier detector is meant in the general sense of effecting whether the carrier detector performs a carrier detection function and thus effecting whether carrier detection is performed. An example, of toggling the power setting of apparatus that "indirectly" controls the carrier detector is toggling one or more of a transceiver IC, or other related ICs of the communications device, which prevent another box (e.g., a processor like a processor 120 in FIG. 1) from performing carrier detection. An example, of toggling the power setting of apparatus that "directly" controls the carrier detector is toggling one or more of a transceiver IC, or other related ICs that include the carrier detector.

As described herein, toggling a power setting between the ON-setting and the OFF-setting is equivalently referred to as "toggling an ON-OFF setting". Accordingly, in some embodiments, the carrier detector is part of a transceiver IC. In other embodiments, the carrier detector comprises a stand-alone IC. Moreover, in addition to toggling the power setting of the apparatus that controls the carrier detector, the power setting of additional ICs in the communication device can be toggled, such as ICs that include/control voltage controlled oscillators, front end filters, power amplifiers, etc. Alternatively, the carrier detector can be implemented as processor-executable code stored in a memory of the communications device. The toggling of the power setting is carried out according to a first duty cycle having a fixed OFF-time duration and a first dwell time having a first dwell time duration. For purposes of this disclosure, the term "dwell time" is used interchangeably with the term "ON-time duration". "on-time" and "ON-time". In addition, during the first dwell time, the carrier detector carries out a carrier detection function.

The device receives at least one input that affects the radio frequency carrier detection function, as described below. Illustratively, the at least one input comprises one or more of: an off-channel detector input; a frequency offset measurement result; a fading characteristic; a suboptimal carrier detect (CD) result; radio personality data; deployment terrain data.

In response to receiving the at least one input, the first duty cycle is changed to a second duty cycle, and the toggling of the power setting is carried out according to the second duty cycle. The second duty cycle has the same fixed OFF-time duration of the first duty cycle and a second dwell time having a second dwell time duration. In particular, the second dwell time duration is longer than the first dwell time duration. During the second dwell time, the radio frequency carrier detection function is performed. Furthermore, upon changing the first duty cycle to the second duty cycle, a probability of carrier detection, by the radio frequency carrier detection function, is increased.

The various methods for managing power consumption in the device, optionally referred to as an "adaptive battery save function", are controlled, in one embodiment, by way of a state machine. To implement the adaptive battery save function, the state machine, in a first state, controls the power setting of the apparatus, which controls the carrier detector, to toggle between the ON-OFF setting according to the first duty cycle having the fixed OFF-time duration and the first dwell time having the first dwell time duration. While in the first state, the at least one input is received for directing the state machine to transition to the second state. While in the second state, the state machine controls the power setting of the apparatus, which controls the carrier detector, to toggle between the ON-OFF setting according to the second duty cycle, which has the same fixed OFF-time duration of the first duty cycle and has the second dwell time with the second dwell time duration that is longer than the first dwell time duration.

A system for managing power consumption as disclosed herein includes the device having apparatus that controls a carrier detector and a state machine circuit coupled to the apparatus. The carrier detector performs the RF carrier detection function, and the state machine circuit implements the adaptive battery save function.

Figure 1:
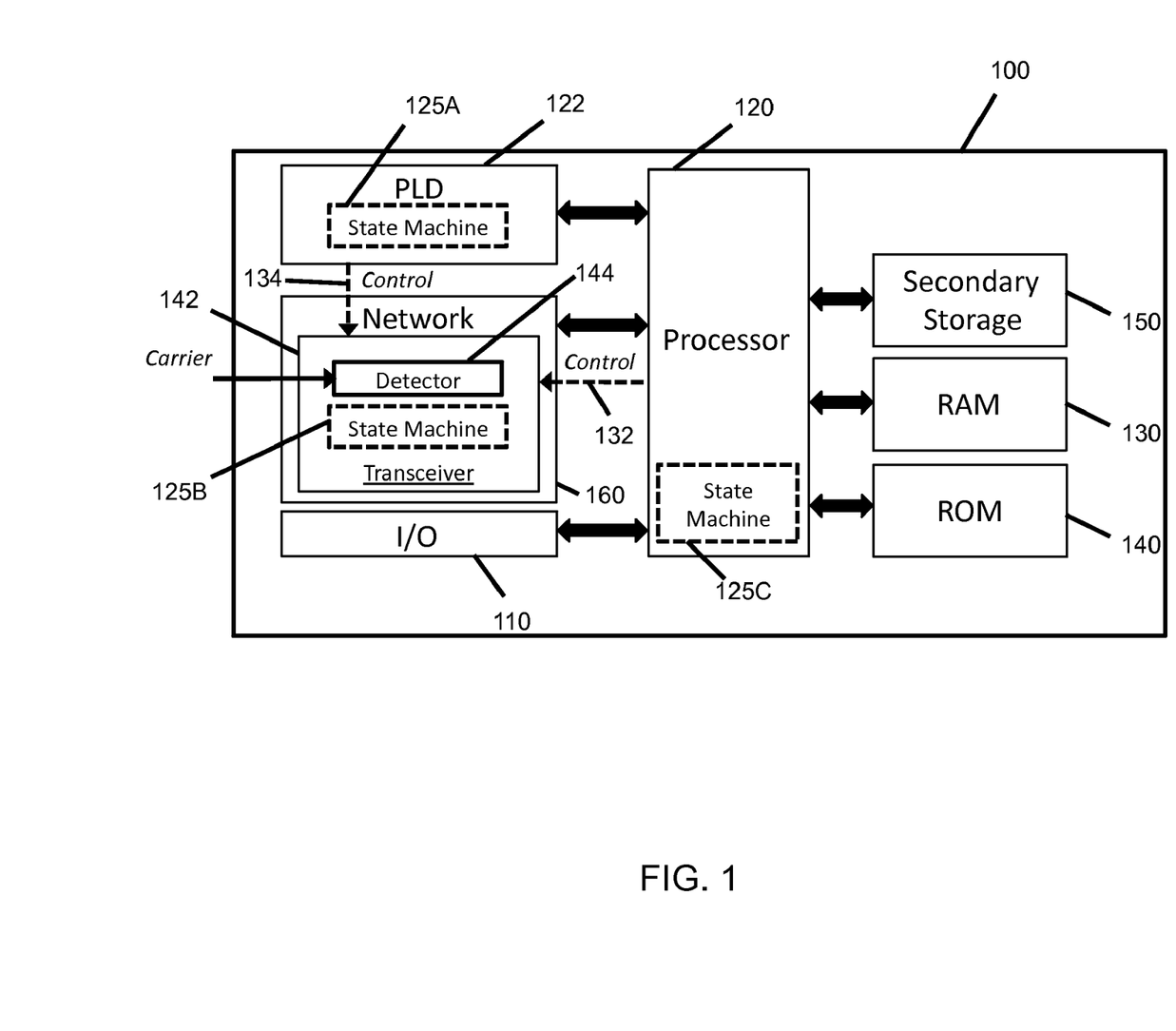
FIG. 1 illustrates a system for managing power consumption in a device in accordance with some embodiments of the present disclosure.

Referring now to the figures, FIG. 1 illustrates a device 100 for managing power consumption. The device 100 provides a general depiction of a physical implementation of various embodiments of the present disclosure. Among other functionalities, the device 100 features a state machine 125 that implements the adaptive battery save function. The device 100 also includes a general-purpose computer system suitable for actualizing one or more embodiments as herein described. The components of the device 100 and their associated functions are optionally embodied in any of a plurality of devices that participate in a communications network such as, for example, a portable radio, a base station, or other suitable fixed or portable communications device.

In particular, the general-purpose computer system includes a processor 120, which is often referred to as a central processor unit or CPU. The processor 120 communicates with various memory devices including a secondary storage 150, a read only memory (ROM) 140, a random access memory (RAM) 130, a plurality of input/output (I/O) devices 110, and a plurality of network connectivity devices 160. The processor 120 can be implemented as one or more CPU chips.

Illustratively, in some embodiments, the processor 120 includes any combination of at least one of a digital signal processor, a reduced instruction set computer processor, a microcontroller, or a microprocessor. As described in more detail below with respect to methods described in conjunction with FIGS. 2-5, the state machine 125 implements the adaptive battery save function. Illustratively, as shown in FIG. 1, one embodiment of the state machine 125 is defined as a state machine 125C within the processor 120. In particular, the state machine 125C provides a control signal 132 to a transceiver 142 (that includes a carrier detector 144), to control the duty cycle of the transceiver 142.

Generally, in the communications network, information is sent between communications devices by modulating a carrier wave at a first communications device and transmitting the modulated carrier wave to a second communications device. Circuitry within the second communications device controls a carrier detector (e.g., the carrier detector 144), which performs a "carrier detection function" defined as a function or process that enables the second communications device to detect the transmitted modulated carrier wave. Toggling the ON-OFF setting of the circuitry that controls the carrier detect function is performed, as described below, to preserve battery life of the communications device.

When embodied as processor-executable code, programs, instructions, or scripts, the state machine implementing the adaptive battery save function is stored and loaded into one or more of the RAM 130, the ROM 140, the secondary storage 150, or at a remote location, wherein these storage devices can comprise any suitable long-term and/or short term storage devices. Accordingly, the adaptive battery save function is accessed by one or more of the plurality of network connectivity devices 160, as described below.

The plurality of network connectivity devices 160 can comprise, among others, modems, modem banks, Ethernet cards, universal serial bus (USB) interface cards, serial port interfaces, parallel port interfaces, a FireWire interface, token ring cards, fiber distributed data interface (FDDI) cards, wireless local area network (WLAN) cards, a global positioning system (GPS) receiver, radio transceiver cards, and other well-known network devices that are operable in accordance with any one or more standard or proprietary interfaces.

Referring again to FIG. 1, an alternative embodiment is shown, wherein the network connectivity devices 160 include the transceiver 142 having circuitry that implement a state machine 125B that performs the adaptive battery save function by controlling the duty cycle of the transceiver, and optionally other related ICs (e.g., that include voltage controlled oscillators, front end filters, power amplifiers, etc.), in accordance with the methods as described herein. Optionally, a state machine 125A, residing in a programmable logic device 122, implements the adaptive battery save function and provides control over the duty cycle of the transceiver 142 via a control signal 134.

The plurality of network connectivity devices 160, for instance, enable the processor 120 to communicate with a global information system or one or more intranets. With such a network connection, the processor 120 receives information from a connected network or outputs information to the network in the course of implementing one or more of the embodiments as described herein. In particular, some of the functionality of the processing, modulating, and transceiver elements, among others, may be performed by means of the processor 120 of the device 100 through programmed logic such as software applications or firmware stored in one of the memory elements of the device 100.

In addition to the above-mentioned functionality, implemented via programmed logic or code, the processor 120 of the device 100 is further programmed with logic or code for performing signaling and functionality to facilitate methods in accordance with the teachings herein, such as methods described below with reference to FIGS. 2-5.

Figure 2:
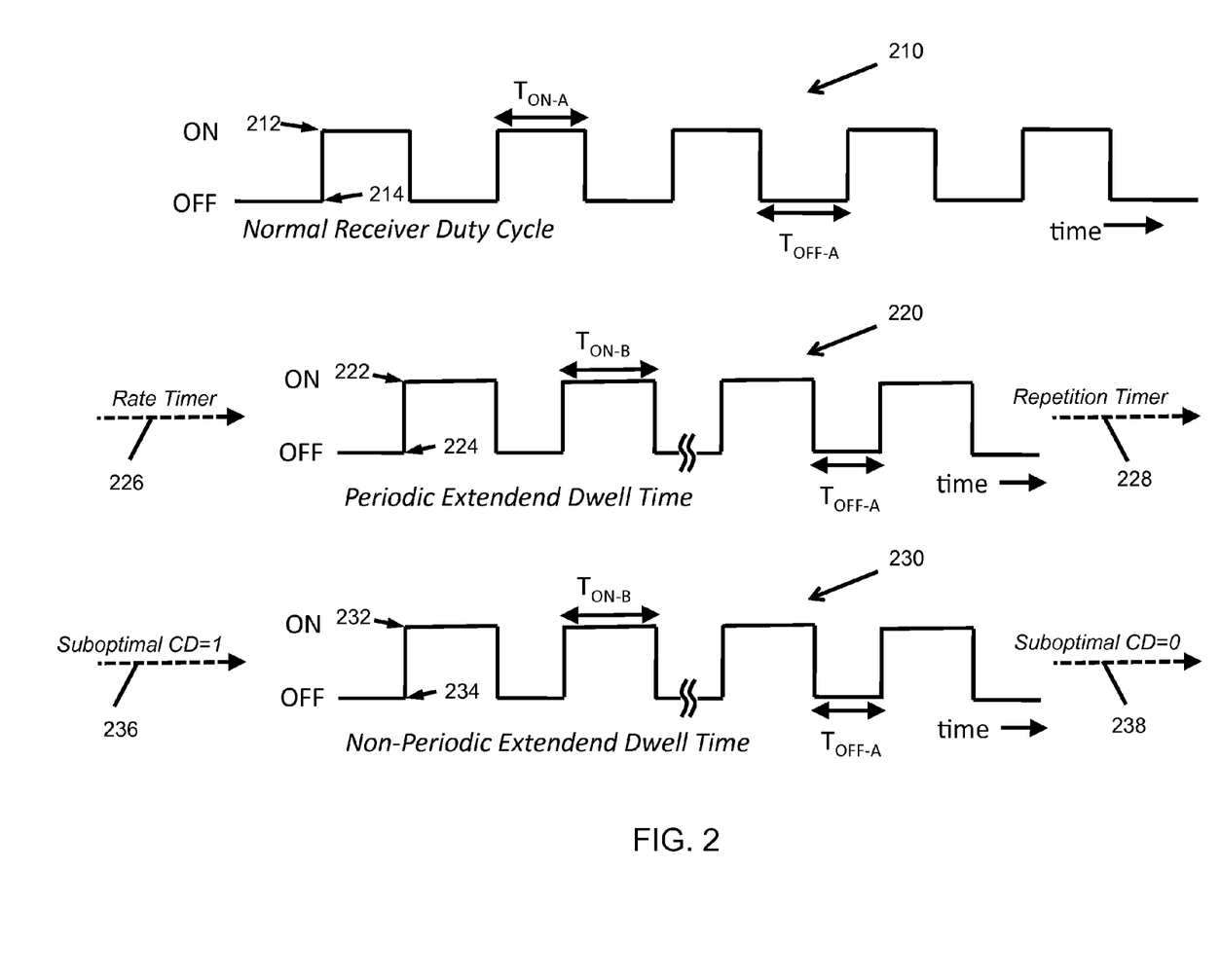
FIG. 2 illustrates a series of timing diagrams for an integrated circuit (IC) responsible for carrier detection in a device in accordance with some embodiments.

Referring now to FIG. 2, a set of waveforms is illustrated. Specifically, FIG. 2 shows a series of timing diagrams for toggling the ON-OFF setting of at least the apparatus responsible for carrier detection such as, for example, the transceiver 142 that includes the detector 144 as shown in FIG. 1, in accordance with various embodiments. Although FIG. 2 is described with respect to the transceiver 142 by way of example, as discussed above the toggling of the ON-OFF setting, as described herein, can be generally applied to transceiver ICs or other related ICs within the communications device. A waveform 210 illustrates a "normal receiver duty cycle" having a fixed ON-time, or dwell time, duration $T_{ON-A}$ and a fixed OFF-time duration $T_{OFF-A}$. The dwell time $T_{ON-A}$ is the time that the transceiver 142 is in an ON-position 212, and the OFF-time $T_{OFF-A}$ is the time that the waveform 210 is in an OFF-position 214. In one embodiment, the ON-time and the OFF-time of the transceiver 142 are substantially equal. Illustratively, the duty cycle of the transceiver 142 is substantially equal to 50%.

As described herein, various embodiments of the present disclosure provide for implementation of an adaptive battery save function, where in response to a combination of fixed and dynamic inputs, the dwell time of the normal receiver duty cycle is replaced by a longer dwell time, while maintaining the OFF-time duration. A longer dwell time duration, a rate of occurrence of longer dwell times, and a number of repetitions of longer dwell times are determined, at least in part, by the fixed and dynamic inputs.

The inputs, discussed further below, include one or more of the following, for example: off-channel activity as measured by an off-channel detector; a measured frequency offset; fading characteristics; radio personality data; radio deployment data; and results of a suboptimal carrier detect function having a higher falsing rate (defined as the rate as which a carrier is mistakenly detected) than an optimal carrier detect function. In effect, the adaptive battery save function, implemented in accordance with the methods described herein, may result in increased detection of RF carrier activity and, thereby, resulting fewer missed calls as compared to communication devices employing fixed duty cycling, by way of illustrative benefits of the teachings herein.

By way of example, FIG. 2 depicts how the duty cycle of the transceiver 142 is adaptively modified from the normal receiver duty cycle (as represented by the waveform 210) to a duty cycle with a longer dwell time duration, such as represented by a waveform 220 or, alternatively, by a waveform 230.

In particular, the waveform 220 features a "periodic extended dwell time" having a fixed ON-time $T_{ON-B}$ that is greater than the fixed ON-time $T_{ON-A}$ of the transceiver 142. The dwell time $T_{ON-B}$ represents the time that the transceiver 142 is in an ON-position 222, and the OFF-time $T_{OFF-A}$ is the time that the waveform 220 is in an OFF-position 224. In FIG. 2, the periodic extended dwell time duty cycle, as represented by the waveform 220, is illustratively shown as having the same fixed OFF-time $T_{OFF-A}$ as that of the normal receiver duty cycle as represented by the waveform 210. As used herein, the term "periodic", "periodically", or in a "periodic manner" means the periodic extended dwell time duty cycle, e.g., as represented by the waveform 220, occurring at regular intervals, for example, as determined by a rate timer and a repetition timer.

In some embodiments, a rate timer signal, as indicated by an arrow 226, controls the transition to the periodic extended dwell time duty cycle, as represented by the waveform 220. The dwell time duration, rate, and repetition of the longer dwell time $T_{ON-B}$ is determined by any combination of fixed and dynamic inputs. After a pre-defined number of cycles or "repetitions" having a longer dwell time $T_{ON-B}$, the duty cycling of the apparatus responsible for carrier detection (e.g., transceiver 142) returns to the normal receiver duty cycle, as represented by the waveform 210. In particular, a repetition timer signal is used to control the transition from the periodic extended dwell time state to the normal receiver duty cycle, as indicated by an arrow 228. Some additional embodiments including various methods for switching between the normal receiver duty cycle as represented by the waveform 210 and the periodic extended dwell time duty cycle, as represented by the waveform 220, are illustratively discussed below with reference to FIGS. 3-5.

Still referring to FIG. 2, the waveform 230 features a "non-periodic extended dwell time" having the fixed ON-time $T_{ON-B}$ that is greater than the fixed ON-time $T_{ON-A}$ of the waveform 210. The ON-time $T_{ON-B}$ is taken as the times when the transceiver 142 is in an ON-position 232, and the OFF-time $T_{OFF-A}$ is the time that the waveform 230 is in an OFF-position 234. As shown, the non-periodic extended dwell time duty cycle, as represented by the waveform 230, has the same fixed OFF-time $T_{OFF-A}$ as that of the normal receiver duty cycle, as represented by the waveform 210. As used herein, the term "non-periodic", "non-periodically", or in a "non-periodic manner" means an irregular occurrence of the non-periodic extended dwell time duty cycle, e.g., as represented by the waveform 230, for example, where the non-periodic extended dwell time duty cycle persists as long as a carrier is detected by a suboptimal CD (suboptimal CD=1), as discussed further below. In contrast to the periodic extended dwell time duty cycle, occurrence of the non-periodic dwell time duty cycle is not based on the rate timer or the repetition timer, but rather on the detection of a carrier by the suboptimal CD (suboptimal CD=1). Moreover, the non-periodic extended dwell time duty cycle will continue or persist until the suboptimal CD=0, that is, when a carrier is no longer detected by the suboptimal CD.

As indicated by an arrow 236, detection of a carrier by the suboptimal CD controls the transition to the non-periodic extended dwell time duty cycle, as represented by the waveform 230. The dwell time duration of the longer dwell time $T_{ON-B}$ is determined by any combination of fixed and dynamic inputs. As shown in FIG. 2, the suboptimal CD=0 signal is used to control the transition out of the non-periodic extended dwell time duty cycle, as indicated by an arrow 238. Additional embodiments including various methods for switching between the normal receiver duty cycle as represented by the waveform 210 and the non-periodic extended dwell time duty cycle, as represented by the waveform 230, as well as methods for switching between the periodic extended dwell time duty cycle and the non-periodic extended dwell time duty cycle, are discussed below with reference to FIGS. 3-5.

Figure 3:
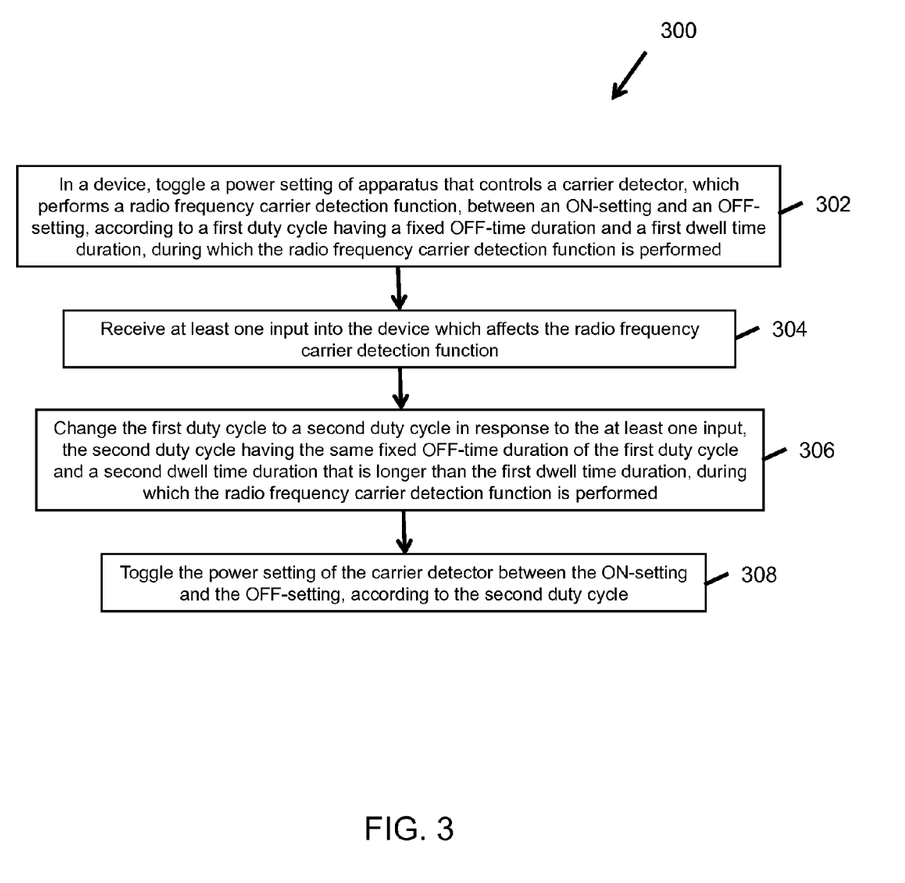
FIG. 3 is a logical flowchart showing an illustrative method for managing power consumption in a device in accordance with some embodiments.

FIG. 3 shows a logical flowchart that illustrates a method 300 for managing power consumption in a communications device in accordance with some embodiments. Accordingly, at 302, the power setting of apparatus that controls a carrier detector, such as for example the transceiver 142 that includes the carrier detector 144 as shown in FIG. 1, is toggled between the ON-setting and the OFF-setting. The carrier detector performs a radio frequency (RF) carrier detection function. Specifically, the power setting is toggled as controlled by a first duty cycle, such as for example the normal receiver duty cycle as represented by the waveform 210 in FIG. 2. The first duty cycle has a fixed OFF-time duration (e.g., $T_{OFF-A}$) and a first dwell time duration (e.g., $T_{ON-A}$). The RF carrier detection function, as performed by the carrier detector, is executed during the first dwell time duration. That is, the RF carrier detection function is executed when the power setting of the transceiver 142 is in the ON-position.

At 304, the communications device receives at least one input that affects the RF carrier detection function. As a result of receiving the at least one input (at 304), at 306, the first duty cycle is changed to a second duty cycle, such as for example the periodic extended dwell time duty cycle, as represented by the waveform 220 or the non-periodic extended dwell time duty cycle, as represented by the waveform 230 in FIG. 2.

The second duty cycle has the same fixed OFF-time duration as the first duty cycle. In addition, the second duty cycle has a second dwell time duration (e.g., $T_{ON-B}$) that is longer than the first dwell time duration of the first duty cycle. Further, the RF carrier detection function is executed during the second dwell time duration. At 308, the power setting of the transceiver 142 is toggled between the ON-setting and the OFF-setting as controlled by the second duty cycle.

Figure 4:
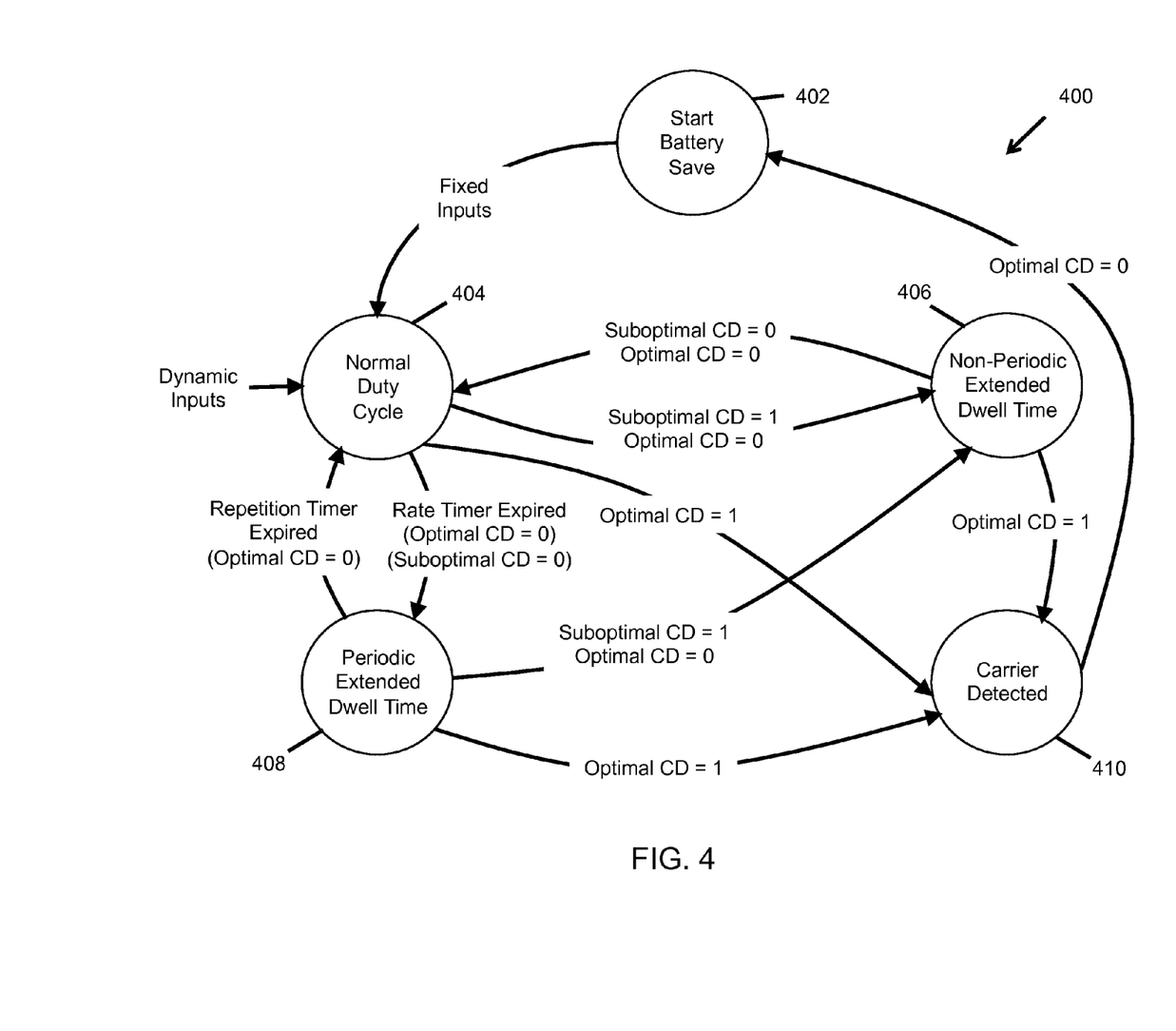
FIG. 4 illustrates a state diagram of a system for managing power consumption in a device in accordance with some embodiments.

FIG. 4 illustrates a state diagram 400 showing the behavior of a state machine for implementing an adaptive battery save function for managing power consumption in a communications device. Accordingly, an adaptive battery save state machine is initialized at a state 402, where for instance a communications device both powers up and one or more fixed inputs are determined For example, in some embodiments a fixed input includes radio personality data comprising at least one of: whether a radio channel includes a digital private line (DPL), or a tone private line (TPL); whether the communications device is operating in a digital or analog mode; or a radio channel bandwidth. In other embodiments, the radio personality includes deployment terrain data as determined, for example, by using any combination of a map database and a GPS receiver implemented as one of the plurality of network connectivity devices 160 as shown in FIG. 1.

Such fixed inputs, in addition to other fixed inputs including other radio modes and/or other radio personality data determined a priori, are used as needed to adjust the duration, rate, and repetitions of longer dwell times and transition the state machine to a state having an extended dwell time. Illustratively, an extended dwell time reliably detects a carrier on a DPL. Similarly, certain deployment terrains, such as urban regions or mountainous and forested regions, require longer dwell times for reliable carrier detection.

The state machine transitions to a state 404, and the power setting of the apparatus responsible for carrier detection is toggled according to the normal receiver duty cycle having a fixed dwell time that is substantially equal to a fixed OFF-time, for example, as represented by the waveform 210 of FIG. 2. While in the state 404, the communications device receives dynamic inputs that are also used as needed to adjust the duration, rate, and repetitions of the longer dwell times. In various embodiments, the dynamic inputs comprise at least one of: an off-channel detector input; a frequency offset measurement result; a fading channel characteristic; or a suboptimal carrier detect (CD) result. Illustratively, for example, if interference is detected by an off-channel detector, then a longer dwell time is applied in order to increase a signal-to-noise ratio (SNR) for a channel being monitored. Similarly, a fading channel requires a longer dwell time for reliable carrier detection.

Any combination of the fixed inputs and the off-channel detector input, the frequency offset measurement result, or the fading channel characteristic results in an update of a duration of a longer dwell time, a rate of occurrence of the longer dwell time, or a number of repetitions of the longer dwell time. In some embodiments, these inputs also result in a transition to a state 408 having a periodic extended dwell time, as illustrated by the waveform 220 of FIG. 2. In addition, expiration of a rate timer also results in the transition from the state 404 to the state 408. Generally, the state 408 corresponds to a duty cycle having a longer, fixed dwell time. Further, after the expiration of N cycles having a longer dwell time, that is after a defined number of repetitions, the state machine returns to the state 404.

While in the state 404, the communications device simultaneously executes an optimal CD function and a suboptimal CD function. As used herein, the term "simultaneous" or "simultaneously" is used to describe functions that are performed at the same time for at least some period of time, for example, by the communications device. The optimal CD function corresponds to the normal detect time having a desired falsing rate, while the suboptimal CD function corresponds to a faster detect time as a result of a higher falsing rate as compared to the desired falsing rate. If a carrier is detected by way of the suboptimal CD function (suboptimal CD=1), then the dwell time is increased over the normal receiver duty cycle. Based on the design of the system, a carrier detected by the suboptimal CD (suboptimal CD=1) results in a transition to a state 406 having a non-periodic extended dwell time. As illustrated in FIG. 4, a suboptimal CD=1 results in a transition to the state 406 having a non-periodic extended dwell time, for example, as represented by the non-periodic extended dwell time duty cycle waveform 230 of FIG. 2.

Alternatively, while in the state 404, a carrier detected by the optimal CD function (optimal CD=1) results in a transition to a state 410 signifying that a true carrier has been detected. Upon a carrier "undetect" (optimal CD=0), the state machine transitions to the initialization state 402. Moreover, the communications device is reconfigured to adapt to changing conditions including radio personality, fading characteristics, and deployment terrain data.

Similarly, while in the state 408, a carrier detected by the optimal CD function (optimal CD=1) results in a transition to a state 410 signifying that a true carrier has been detected and there was no false alarm. Upon a carrier undetect (optimal CD=0), the state machine transitions to the initialization state 402.

Also, while in the state 408, if a carrier is detected by the suboptimal CD (suboptimal CD=1) and not by the optimal CD (optimal CD=0), then the state machine transitions to the state 406. While in the state 406, a carrier detected by the optimal CD function (optimal CD=1) results in a transition to a state 410 signifying that a true carrier has been detected, and the optimal CD function resets itself (optimal CD=0) as the state machine transitions to the initialization state 402. However, in various embodiments, if the suboptimal CD no longer detects a carrier (suboptimal CD=0) and a carrier has not been detected by the optimal CD (optimal CD=0), then the state machine returns to the state 404 having the normal receiver duty cycle.

Figure 5:
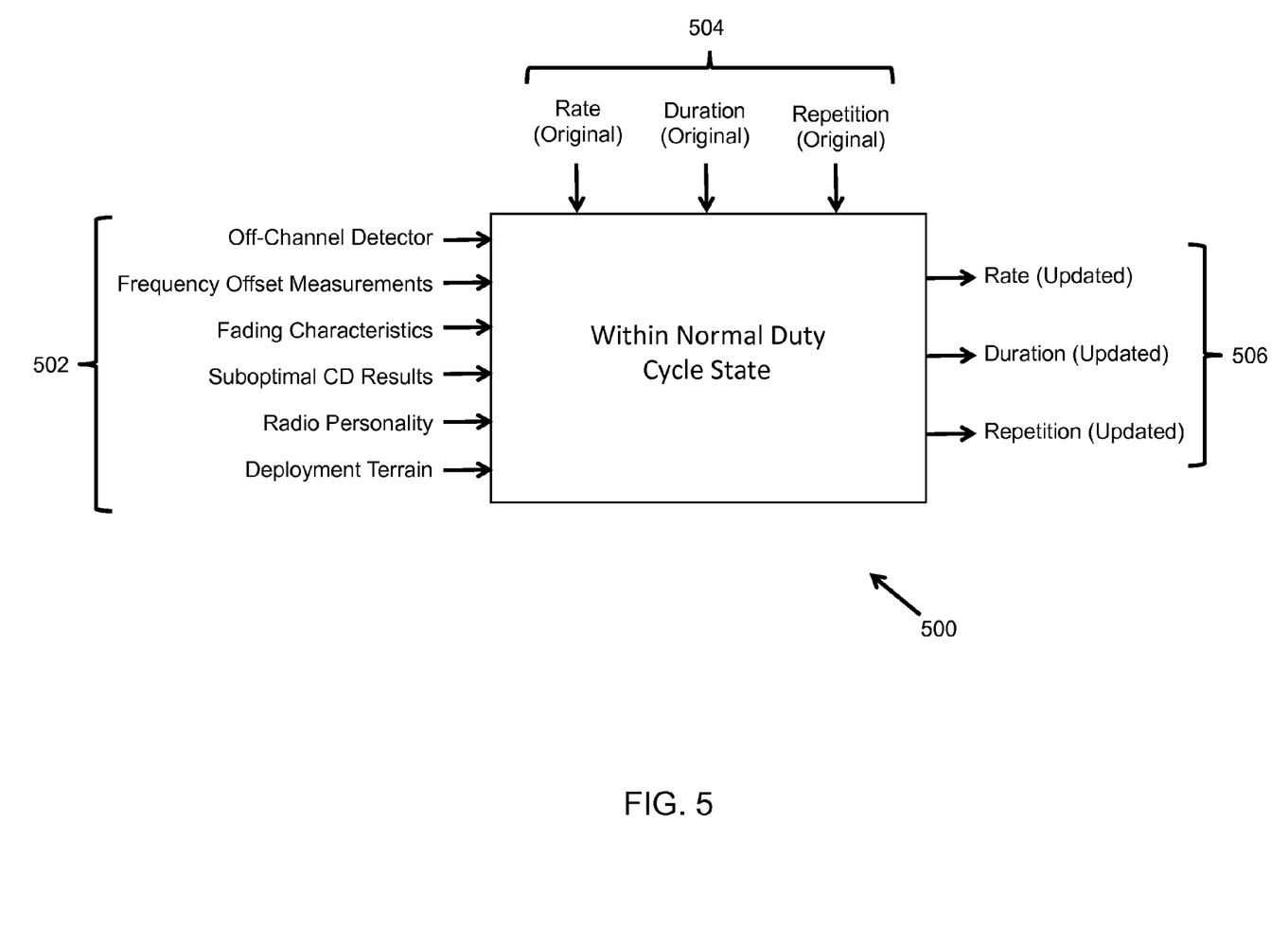
FIG. 5 illustrates a method for managing power consumption in a device in accordance with some embodiments.

Referring now to FIG. 5, a method 500 useful for managing power consumption in a communications device in accordance with various embodiments is shown. Based on any combination of a fixed or a dynamic input, the method 500 updates at least one of: a duration of a longer dwell time; a rate of occurrence of the longer dwell time; or a number of repetitions of the longer dwell time. For purposes of this disclosure, the duration of the longer dwell time is equivalently referred to as "duration", the rate of occurrence of the longer dwell time is equivalently referred to as "rate", and the number of repetitions of the longer dwell time is equivalently referred to as "repetitions". While within the normal duty cycle state, for example the state 404 of FIG. 4, the method 500 operates a transceiver or carrier detector IC according to a duty cycle having a pre-defined or "original" duration, rate, and repetitions, as illustrated by inputs 504. The method 500 receives, by way of inputs 502, a combination of at least one fixed and dynamic input. Accordingly, each input comprises at least one of: an off-channel detector input; a frequency offset measurement result; a fading characteristic; a suboptimal CD result; radio personality data; or deployment terrain data.

Specific conditions for one or more of the above-mentioned inputs results in one or more of an updated duration, rate, or repetitions. For example, an update in the duration, rate, or repetitions occurs when the off-channel detector input passes a pre-defined received signal strength indicator (RSSI) threshold value. Similarly, the duration, rate, or repetitions are updated when a frequency offset measurement value is greater than a pre-defined number of hertz (Hz). Statistics on fading characteristics are maintained related to a fading environment in which the communications device is operating. When a pre-defined function of such statistics exceeds a threshold value, the duration, rate, or repetitions are updated. Radio personality data also causes an update in the duration, rate, or repetitions. For example, a digital private line (DPL) requires a longer dwell time for reliable carrier detection. Deployment terrain data as determined, for example, by using any combination of a map database and a GPS receiver is also used to update the duration, rate, and repetitions. Illustratively, urban regions or mountainous and forested regions, may require longer dwell times for reliable carrier detection. Furthermore, carrier detection by the suboptimal CD, having a higher falsing rate and faster detection capability, causes an update in one or more of the duration, rate, and repetitions. In various embodiments, other inputs 502 including input parameters known to those skilled in the art can be used.

As shown by outputs 506, at least one of: a duration of a longer dwell time; a rate of occurrence of the longer dwell time; or a number of repetitions of the longer dwell time, has been updated. Thus, the method 500 operates the transceiver or carrier detector IC according to a duty cycle having at least one of: an updated duration; an updated rate; or an updated number of repetitions.

As one illustrative example, while in the normal duty cycle state the rate equals 'x', for example 250 ms, the duration equals 'y', for example 25 ms, and the repetitions equals 'z', for example one (1). In various embodiments, the repetitions 'z' equals any integer value greater than or equal to one (1). Upon receiving one or more of the inputs 502, one option for transitioning to the periodic extended dwell time state includes, for example changing the duration 'y' from 25 ms to 50 ms. If, for example, the IC responsible for carrier detection is already operating according to a periodic extended dwell time, as determined by the method 500, when one or more inputs 502 is detected, then the existing values of rate, duration, and repetitions are updated. In one example, the rate 'x' is changed from 250 ms to 125 ms, the duration 'y' is changed from 50 ms to 75 ms, and the repetitions 'z' is changed from one (1) to five (5). In various embodiments, depending on the actual values of inputs 502, one or more of the outputs 506 is updated to any other value as determined by any suitable algorithm.

The outputs 506 can also be used to adjust various other parameters of the communications device, such as a radio. In some embodiments, the outputs 506 are sent to an automatic frequency control (AFC) state machine to help keep the radio tuned to a desired detection frequency. The outputs 506 can also be sent to an automatic gain control (AGC) state machine to compensate for fluctuations in an on-channel signal. In some embodiments, the outputs 506 are used to optimize sequences of an RFIC. In addition, the outputs 506 can be used to save a last known duty cycle rate, duration, and repetitions for sharing with other communications devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing power consumption in a device, the method comprising:
   at a device having a carrier detector that performs a radio frequency carrier detection function:
   toggling a power setting of apparatus, which controls the carrier detector, between an on setting and an off setting, according to a first duty cycle having a fixed off-time duration and a first dwell time having a first dwell time duration, during which the radio frequency carrier detection function is performed;
   receiving at least one input that affects the radio frequency carrier detection function;
   changing the first duty cycle to a second duty cycle in response to the at least one input, wherein the second duty cycle has the same fixed off-time duration of the first duty cycle and a second dwell time having a second dwell time duration that is longer than the first dwell time duration, during which the radio frequency carrier detection function is performed; and
   toggling the power setting of the apparatus, which controls the carrier detector, between the on setting and the off setting, according to the second duty cycle.

2. The method of claim 1, wherein the at least one input comprises at least one of: an off-channel detector input; a frequency offset measurement result; a fading characteristic; a suboptimal carrier detect (CD) result; radio personality data; or deployment terrain data.

3. The method of claim 1 further comprising:
   determining a rate of occurrence of the second duty cycle based on the at least one input; and
   alternately changing between the first duty cycle and the second duty cycle according to the rate of occurrence.

4. The method of claim 1 further comprising:
   determining a number of repetitions of the second dwell time based on the at least one input.

5. The method of claim 1 further comprising:
   performing a first radio frequency carrier detection function having a first falsing rate; and
   simultaneously performing a second radio frequency carrier detection function having a second falsing rate, wherein the second falsing rate is greater than the first falsing rate.

6. The method of claim 1, wherein:
   the second dwell time duration is substantially constant; and
   the power setting of the apparatus that controls the carrier detector is periodically toggled between the on setting and the off setting, according to the second duty cycle.

7. The method of claim 1, wherein:
   the second dwell time duration is changed based on the at least one input; and
   the power setting of the apparatus that controls the carrier detector is non-periodically toggled between the on setting and the off setting, according to the second duty cycle.

8. A method for managing power consumption in a device, the method comprising:
   a state machine performing:
   while in a first state, controlling a power setting of apparatus, which controls a carrier detector, to toggle between an on setting and an off setting according to a first duty cycle having a fixed off-time duration and a first dwell time having a first dwell time duration, during which a radio frequency carrier detection function is performed;
   while in the first state, receiving at least one input that directs the state machine to transition to a second state; and
   while in the second state, controlling the power setting of the apparatus, which controls the carrier detector, to toggle between the on setting and the off setting according to a second duty cycle having the same fixed off-time duration of the first duty cycle and having a second dwell time having a second dwell time duration that is longer than the first dwell time duration, during which the radio frequency carrier detection function is performed.

9. The method of claim 8, wherein the at least one input comprises at least one of: an off-channel detector input; a frequency offset measurement result; a fading characteristic; a suboptimal carrier detect (CD) result; radio personality data; a rate timer; or deployment terrain data.

10. The method of claim 8, wherein the second dwell time duration is substantially constant, and wherein, while in the second state, the state machine controls the power setting of the apparatus, which controls the carrier detector, to toggle between the on setting and the off setting in a periodic manner.

11. The method of claim 8, wherein the second dwell time duration is variably adjusted based on the at least one input, and wherein, while in the second state, the state machine controls the power setting of the apparatus, which controls the carrier detector, to toggle between the on setting and the off setting in a non-periodic manner.

12. The method of claim 8 further comprising, while in the first state:
controlling the carrier detector to perform a first radio frequency carrier detection function having a first falsing rate; and
simultaneously controlling the carrier detector to perform a second radio frequency carrier detection function having a second falsing rate, wherein the second falsing rate is greater than the first falsing rate.

13. The method of claim 12 further comprising:
upon detection of a carrier by the second radio frequency carrier detection function, controlling the state machine to transition to the second state.

14. The method of claim 12 further comprising:
while in the first state, detecting a carrier by the first radio frequency carrier detection function; and
controlling the state machine to transition to an initialization state.

15. The method of claim 13 further comprising:
while in the second state, detecting a carrier by the first radio frequency carrier detection function; and
controlling the state machine to transition to the initialization state.

16. The method of claim 8 further comprising:
while in the second state, receiving at least one input that directs the state machine to transition to the first state.

17. The method of claim 16, wherein the at least one input that directs the state machine to transition to the first state comprises at least one of: a repetition timer or a suboptimal carrier detect (CD) result.

18. A system for managing power consumption in a device comprising:
a device comprising apparatus, which controls a carrier detector that performs a radio frequency carrier detection function; and
a state machine circuit coupled to the apparatus, wherein the state machine circuit controls an adaptive battery save function;
wherein the adaptive battery save function toggles a power setting of the apparatus, which controls carrier detector, between an on setting and an off setting according to a first duty cycle having a fixed off-time duration and a first dwell time having a first dwell time duration, during which the radio frequency carrier detection function is performed;
wherein the adaptive battery save function changes the first duty cycle to a second duty cycle in response to at least one received input, wherein the second duty cycle has the same fixed off-time duration of the first duty cycle and a second dwell time having a second dwell time duration that is longer than the first dwell time duration, during which the radio frequency carrier detection function is performed; and
wherein the adaptive battery save function toggles the power setting of apparatus, which includes the carrier detector, between the on setting and the off setting according to the second duty cycle.

19. The system of claim 18, wherein the at least one received input comprises at least one of: an off-channel detector input; a frequency offset measurement result; a fading characteristic; a suboptimal carrier detect (CD) result; radio personality data; or deployment terrain data.

20. The system of claim 18, wherein the carrier detector simultaneously performs a first radio frequency carrier detection function having a first falsing rate and a second radio frequency carrier detection function having a second falsing rate, wherein the second falsing rate is greater than the first falsing rate.

* * * * *

UNITED STATES PATENT AND TRADEMARK OFFICE
CERTIFICATE OF CORRECTION

| | | |
|---|---|---|
| PATENT NO. | : 8,295,893 B2 | Page 1 of 1 |
| APPLICATION NO. | : 12/879053 | |
| DATED | : October 23, 2012 | |
| INVENTOR(S) | : Rao et al. | |

It is certified that error appears in the above-identified patent and that said Letters Patent is hereby corrected as shown below:

In Column 3, Line 7, delete "duration"." and insert -- duration", --, therefor.

In Column 5, Line 46, delete "rate as" and insert -- rate at --, therefor.

In Column 7, Line 37, delete "determined" and insert -- determined. --, therefor.

Signed and Sealed this
Fifth Day of February, 2013

Teresa Stanek Rea
*Acting Director of the United States Patent and Trademark Office*